US012388240B2

(12) United States Patent
Miyamoto

(10) Patent No.: US 12,388,240 B2
(45) Date of Patent: Aug. 12, 2025

(54) SWITCHING SYSTEM

(71) Applicant: Panasonic Intellectual Property Management Co., Ltd., Osaka (JP)

(72) Inventor: Kengo Miyamoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 18/172,770

(22) Filed: Feb. 22, 2023

(65) Prior Publication Data

US 2023/0275405 A1  Aug. 31, 2023

(30) Foreign Application Priority Data

Feb. 28, 2022  (JP) ................. 2022-030355

(51) Int. Cl.
*H02B 1/24* (2006.01)
*H02B 1/20* (2006.01)
*H02B 1/30* (2006.01)

(52) U.S. Cl.
CPC ............. *H02B 1/24* (2013.01); *H02B 1/202* (2013.01); *H02B 1/30* (2013.01)

(58) Field of Classification Search
CPC ........................................................ H02B 1/24
See application file for complete search history.

(56) References Cited

U.S. PATENT DOCUMENTS

| 7,688,573 B2* | 3/2010 | Ranta | H02B 1/056 361/652 |
| 9,559,521 B1* | 1/2017 | King | H02J 9/06 |
| 2012/0197453 A1 | 8/2012 | Pugh et al. | |

FOREIGN PATENT DOCUMENTS

| JP | 2012-075216 A | 4/2012 |
| JP | 2017-099183 A | 6/2017 |
| JP | 2019-198203 A | 11/2019 |

OTHER PUBLICATIONS

Notice of Reasons for Refusal issued in corresponding Japanese Patent Application No. 2022-030355 dated Jan. 28, 2025, with English translation.

* cited by examiner

*Primary Examiner* — Daniel Kessie
(74) *Attorney, Agent, or Firm* — Rimon P.C.

(57) ABSTRACT

A switching system includes a power switching section, a control module, and a casing. The power switching section includes at least one power transfer switch and a power selector. The power selector opens and closes the at least one power transfer switch. The control module includes one or more supply transfer switches and a supply controller. The supply controller opens and closes the one or more supply transfer switches. The casing houses the power switching section and the control module.

13 Claims, 9 Drawing Sheets

SWITCHING SYSTEM

CROSS-REFERENCE TO RELATED APPLICATIONS

The present application is based upon, and claims the benefit of priority to, Japanese Patent Application No. 2022-030355, filed on Feb. 28, 2022, the entire contents of which are hereby incorporated by reference.

TECHNICAL FIELD

The present disclosure generally relates to a switching system and more particularly relates to a switching system for changing the state of power delivery to a load circuit.

BACKGROUND ART

US 2012/197453 A1 teaches a technique for controlling power delivery to a load (load circuit). More specifically, an electrical power management system of US 2012/197453 A1 includes a circuit and a control module. The circuit includes a smart node, a breaker, a sensor, and the load. The smart node is controlled by a control signal transmitted from the control module. The smart node controls the amount of power delivered from a power supply to the load.

The electrical power management system of US 2012/197453 A1 requires increased installation man hours when introduced into a facility.

SUMMARY

The present disclosure provides a switching system with the ability to reduce the installation man hours required.

A switching system according to an aspect of the present disclosure includes a power switching section, a control module, and a casing. The power switching section includes at least one power transfer switch and a power selector. The at least one power transfer switch is electrically connected between a plurality of power supplies and a main breaker of a distribution board. The plurality of power supplies includes a first power supply and a second power supply. The power selector changes a first state where power is delivered from the first power supply to the main breaker into a second state where power is delivered from the second power supply to the main breaker, or vice versa, by opening and closing the at least one power transfer switch. The control module includes one or more supply transfer switches and a supply controller. The one or more supply transfer switches are electrically connected between one or more branch breakers out of a plurality of branch breakers of the distribution board and one or more load circuits associated one to one with the one or more branch breakers. The supply controller opens and closes the one or more supply transfer switches. The casing houses the power switching section and the control module.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Embodiments of a switching system according to the present disclosure will be described with reference to the accompanying drawings. Note that the embodiments to be described below are only exemplary ones of various embodiments of the present disclosure and should not be construed as limiting. Rather, the exemplary embodiments may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

First Embodiment (Overview)

Figure 1:
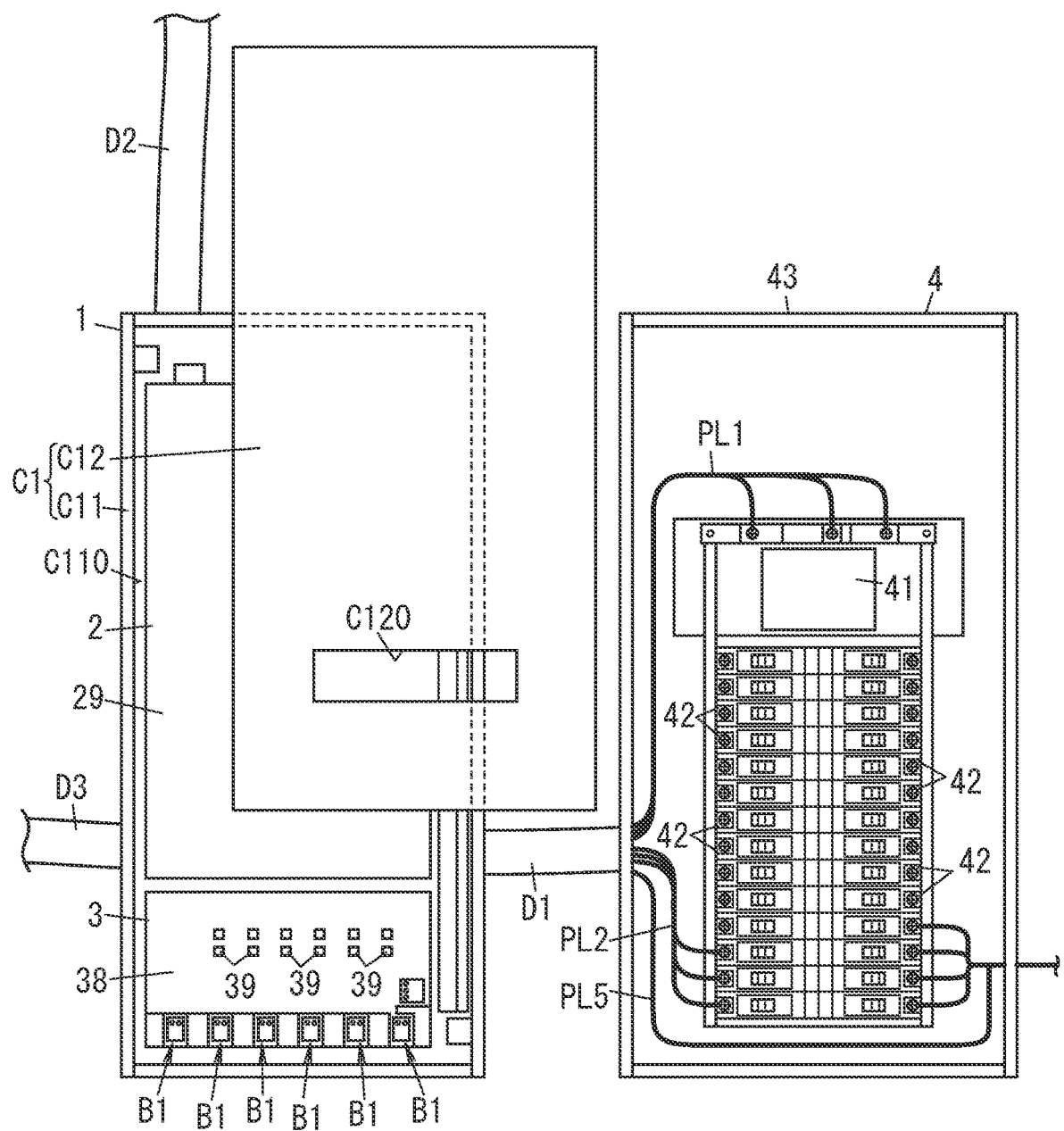
FIG. 1 is a front view illustrating an installation state of a switching system according to a first embodiment.
Figure 2:
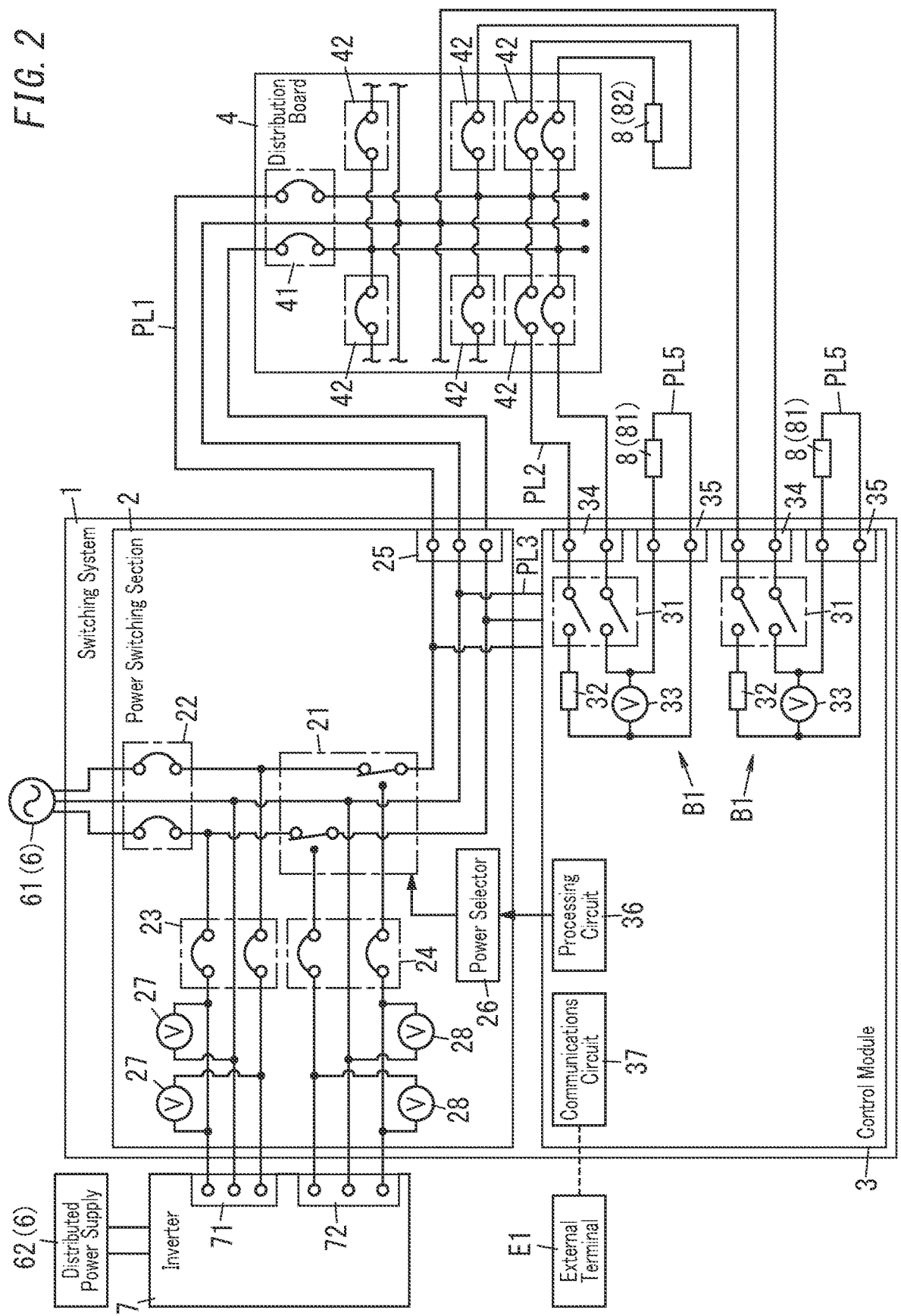
FIG. 2 is a circuit diagram illustrating a configuration for the switching system.

As shown in FIGS. 1 and 2, a switching system 1 includes a power switching section 2. The power switching section 2 may be, for example, an automatic transfer switch (ATS). The power switching section 2 automatically switches power supplies 6 as power supply sources. In this embodiment, the power switching section 2 is connected to two power supplies 6, namely, a first power supply 61 and a second power supply 62. The first power supply 61 is a commercial power supply. The second power supply 62 is a distributed power supply. The power switching section 2 automatically switches from a first state where power is delivered from the first power supply 61 to a second state where power is delivered from the second power supply 62, and vice versa. The power switching section 2 outputs the power thus received.

The switching system 1 further includes a control module 3. Also, the switching system 1 is used along with a distribution board 4. The power switching section 2 outputs the power delivered from either the first power supply 61 or the second power supply 62 to the distribution board 4. The distribution board 4 distributes the received power to a plurality of branch circuits (including branch breakers 42). One or more branch circuits out of the plurality of branch circuits are electrically connected to the control module 3. The control module 3 includes one or more supply transfer switches 31 for cutting off the power supplied from the one or more branch circuits. While the supply transfer switch(es) 31 is/are closed, the power supplied from the branch circuit(s) is delivered to load circuit(s) 8 via the control module 3.

As shown in FIGS. 1 and 2, the switching system 1 according to this embodiment includes the power switching section 2, the control module 3, and a casing C1. The power switching section 2 includes at least one power transfer switch 21 and a power selector 26. The at least one power transfer switch 21 is electrically connected between the plurality of power supplies 6, including the first power supply 61 and the second power supply 62, and a main breaker 41 of the distribution board 4. The power selector 26 changes a first state where power is delivered from the first power supply 61 to the main breaker 41 into a second state where power is delivered from the second power supply 62 to the main breaker 41, or vice versa, by opening and closing the at least one power transfer switch 21. The control module 3 includes one or more supply transfer switches 31 and a supply controller 361 (refer to FIG. 3). The one or more supply transfer switches 31 are electrically connected between one or more branch breakers 42 out of a plurality of branch breakers 42 of the distribution board 4 and one or more load circuits 8 associated one to one with the one or more branch breakers 42. The supply controller 361 opens and closes the one or more supply transfer switches 31. The casing C1 houses the power switching section 2 and the control module 3.

This embodiment enables reducing the man hours required to install the power switching section 2 and the control module 3 (in a customer's facility) compared to a situation where the power switching section 2 and the control module 3 are housed in two different casings. For example, an electric cable (which may be either a power line or a signal line) for connecting the power switching section 2 and the control module 3 to each other may be provided in advance, thus enabling reducing the man hours required for wiring. In addition, the same set of electric cables is usable for both the power switching section 2 and the control module 3, which also contributes to reducing the installation man hours. Furthermore, this also contributes to reducing the man hours required for mounting the power switching section 2 and the control module 3.

Furthermore, the distribution board 4 to be used by being connected to the switching system 1 does not have to be compliant with any special specification, thus enabling introducing the switching system 1 without replacing the existent distribution board 4. This contributes to cutting down the installation man hours and introduction costs.

(Details)

Next, a switching system 1 according to this embodiment will be described in further detail. In the following description of embodiments, a power distribution system for an electric circuit to which the switching system 1 is applied is supposed to be a single-phase three-wire system. However, the power distribution system for the electric circuit to which the switching system 1 is applied does not have to be a single-phase three-wire system but may be, for example, a single-phase two-wire system, a three-phase three-wire system, or a three-phase four-wire system as well.

(1) Power Supplies and Inverter

As shown in FIG. 2, the power switching section 2 is connected to the first power supply 61 and the second power supply 62. As described above, the first power supply 61 is a commercial power supply and the second power supply 62 is a distributed power supply. In this embodiment, the first power supply 61 (commercial power supply) delivers AC power and the second power supply 62 (distributed power supply) delivers DC power. In this embodiment, the power switching section 2 is connected to the second power supply 62 via an inverter 7.

Examples of the distributed power supply include various types of power generation systems such as solar power generation systems, hydraulic power generation systems, fuel cell systems, and diesel power generation systems. Alternatively, the distributed power supply may also be a rechargeable battery system. Optionally, the power switching section 2 may be connected to a plurality of distributed power supplies.

The inverter 7 converts the DC power delivered from the second power supply 62 into AC power. In addition, the inverter 7 outputs the AC power thus converted to the power switching section 2. The inverter 7 includes grid-connected terminals 71 and autonomous terminals 72.

The inverter 7 operates in either a grid-connected operation mode or an autonomous operation mode. In the grid-connected operation mode, the grid-connected terminals 71 of the inverter 7 are electrically connected to the first power supply 61 (commercial power supply). In the autonomous operation mode, on the other hand, the inverter 7 outputs the AC power to output terminals 25 of the power switching section 2 via the autonomous terminals 72.

(2) Power Switching Section

As shown in FIG. 2, the power switching section 2 includes at least one power transfer switch 21, a service breaker 22, a grid-connected breaker 23, an autonomous breaker 24, the output terminals 25, and the power selector 26.

The power transfer switch 21 may be a mechanical switch or configured as a combination of plurality of semiconductor switches, whichever is appropriate.

The output terminals 25 are electrically connected to primary side terminals of the main breaker 41 of the distribution board 4.

The service breaker 22 is electrically connected to the first power supply 61. The service breaker 22 and the output terminals 25 are electrically connected to each other via the three electric wires of the single-phase three-wire system. Specifically, the service breaker 22 and the output terminals 25 are electrically connected to each other via two voltage lines (namely, an L1-phase electric wire and an L2 phase electric wire) and a neutral line (i.e., N-phase electric wire).

In this embodiment, the power transfer switch 21 is a c-contact switch. The power transfer switch 21 alternately switches to a first connection state and a second connection state by changing connection between its contacts. The first connection state herein refers to a state where the service breaker 22 and the output terminals 25 are electrically connected to each other and the autonomous terminals 72 of the inverter 7 and the output terminals 25 are electrically disconnected from each other. On the other hand, the second connection state herein refers to a state where the service breaker 22 and the output terminals 25 are electrically disconnected from each other and the autonomous terminals 72 of the inverter 7 and the output terminals 25 are electrically connected to each other. Note that in the power transfer switch 21, the neutral line (i.e., the middle line extended from the first power supply 61 in FIG. 2) does not have to be electrically disconnected as shown in FIG. 2. The neutral line does not have to be electrically disconnected in any other switches or breakers.

Meanwhile, the power transfer switch 21 and the autonomous terminals 72 of the inverter 7 are electrically connected to each other via the three electric wires of the single-phase three-wire system. The two voltage lines out of the three electric wires are provided with the autonomous breaker 24.

The service breaker 22 and the grid-connected terminals 71 of the inverter 7 are electrically connected to each other via the three electric wires of the single-phase three-wire system. The two voltage lines out of the three electric wires are provided with the grid-connected breaker 23.

The power selector 26 includes, for example, a microcontroller. The power selector 26 opens and closes the power transfer switch 21. As used herein, opening and closing the power transfer switch 21 means bringing the contacts of the power transfer switch 21 into, and out of, contact with each other. In this embodiment, the power transfer switch 21 is configured as a c-contact switch. Thus, opening and closing the power transfer switch 21 means switching from the first connection state to the second connection state and vice versa.

For example, if the power transfer switch 21 is a mechanical switch, then the power selector 26 opens and closes the power transfer switch 21 by controlling a motorized actuator provided in the vicinity of the power transfer switch 21. Also, if the power transfer switch 21 includes a semiconductor switch (in particular, a metal-oxide semiconductor field effect transistor (MOSFET)), then the power selector 26 opens and closes the power transfer switch 21 by changing the gate voltage of the MOSFET.

The power selector 26 changes the state of power delivery to the main breaker 41 of the distribution board 4 from a first state into a second state, or vice versa, by opening and closing the power transfer switch 21. The first state is a state where power is delivered from the first power supply 61 (commercial power supply) to the main breaker 41. The second state is a state where power is delivered from the second power supply 62 (distributed power supply) to the main breaker 41. The first connection state described above corresponds to the first state and the second connection state described above corresponds to the second state.

The power selector 26 opens and closes the power transfer switch 21 in accordance with information transmitted from a processing circuit 36 of the control module 3.

In addition, the switching system 1 further includes a plurality of (e.g., two in FIG. 2) first supply voltage detector circuits 27 and a plurality of (e.g., two in FIG. 2) second supply voltage detector circuits 28.

Each of the first supply voltage detector circuits 27 detects a first voltage supplied from the first power supply 61 (commercial power supply) to the power transfer switch 21. Each of the first supply voltage detector circuits 27 is connected to two terminals and detects the voltage between the two terminals. The two terminals are provided, for example, between the power transfer switch 21 and the grid-connected terminals 71 of the inverter 7.

Each of the second supply voltage detector circuits 28 detects a second voltage supplied from the second power supply 62 (distributed power supply) to the power transfer switch 21. Each of the second supply voltage detector circuits 28 is connected to two terminals and detects the voltage between the two terminals. The two terminals are provided, for example, between the power transfer switch 21 and the autonomous terminals 72 of the inverter 7.

In FIG. 2, the two first supply voltage detector circuits 27 and the two second supply voltage detector circuits 28 are illustrated as being provided for the power switching section 2. Actually, the first supply voltage detector circuits 27 and the second supply voltage detector circuits 28 may be housed in a housing 38 (refer to FIG. 1) of the control module 3.

As shown in FIG. 1, the power switching section 2 further includes a housing 29. The housing 29 is housed in the casing C1 of the switching system 1. The housing 29 houses other constituent elements of the power switching section 2. Specifically, the housing 29 houses the power transfer switch 21, the service breaker 22, the grid-connected breaker 23, the autonomous breaker 24, the output terminals 25, and the power selector 26.

(3) Distribution Board

As shown in FIG. 2, the distribution board 4 includes the main breaker 41 and a plurality of (e.g., six in FIG. 2) branch breakers 42.

The primary side terminals of the main breaker 41 and the output terminals 25 of the power switching section 2 are electrically connected to each other via the three electric wires (first power cables PL1) of the single-phase three-wire system. The three electric wires of the single-phase three-wire system are extended from secondary side terminals of the main breaker 41. Two voltage lines (namely, the L1-phase electric wire and the L2-phase electric wire) out of these three electric wires are electrically connected to the respective primary side terminals of the plurality of branch breakers 42.

More specifically, taking one branch breaker 42, for example, the primary side terminals thereof are electrically connected to one or two voltage lines out of the three electric wires. The branch breaker 42 outputs, from secondary side terminals thereof, a voltage corresponding to either the potential difference between one voltage line and neutral line electrically connected to the primary side terminals or the potential difference between two voltage lines electrically connected to the primary side terminals. For example, according to the supply voltage specification in the United States, the potential difference between the L1 phase or L2 phase and the N phase is 120 V and the potential difference between the L1 phase and the L2 phase is 240 V.

Taking at least one branch breaker 42 out of the plurality of branch breakers 42, the secondary side terminals of the branch breaker 42 are electrically connected to the input terminals 34 of the control module 3. More specifically, the secondary side terminals of the branch breaker 42 and the input terminals 34 of the control module 3 are electrically connected to each other via one or two voltage lines (second power cables PL2).

Furthermore, as shown in FIG. 1, the distribution board 4 further includes a cabinet 43. The cabinet 43 houses the other constituent elements of the distribution board 4. Specifically, the cabinet 43 houses the main breaker 41 and the plurality of branch breakers 42.

(4) Control Module

As shown in FIG. 2, the control module 3 includes a plurality of (e.g., two in FIG. 2) circuit blocks B1, the processing circuit 36, and a communications circuit 37. Each of the plurality of circuit blocks B1 includes a supply transfer switch 31, a current detector circuit 32, a voltage detector circuit 33, the input terminals 34, and output terminals 35.

The neutral line extended from the distribution board 4 and one voltage line extended from one secondary side terminal of an associated branch breaker 42 are electrically connected to the input terminals 34. Alternatively, two voltage lines extended from the secondary side terminals of the associated branch breaker 42 are electrically connected to the input terminals 34. That is to say, each circuit block B1 accepts the voltage between the L1 and L2 phases and the voltage between the L1 or L2 phase and the N phase.

The output terminals 35 are electrically connected to a load circuit 8. The load circuit 8 includes at least one load. Also, a plurality of load circuits 8 are provided.

Note that not all of the plurality of load circuits 8 have to be electrically connected to the output terminals 35 of the control module 3. As shown in FIG. 2, some load circuits 81 may be electrically connected to the output terminals 35 and another load circuit 82 may be electrically connected to secondary side terminals of one branch breaker 42 of the distribution board 4 not via the control module 3.

The input terminals 34 and the output terminals 35 are electrically connected to each other via two electric wires. Between the input terminals 34 and the output terminals 35, provided are the supply transfer switch 31, the current detector circuit 32, and the voltage detector circuit 33.

The supply transfer switch 31 may be either a mechanical switch or a semiconductor switch, whichever is appropriate. Opening and closing the supply transfer switch 31 allows the input terminals 34 and the output terminals 35 to be selectively electrically connected to each other or electrically disconnected from each other.

The current detector circuit 32 detects a current flowing between the input terminals 34 and the output terminals 35. That is to say, the current detector circuit 32 detects a current to be supplied to the load circuit 8 via the output terminals 35. The current detector circuit 32 includes, for example, a shunt resistor, a hall element current sensor, a current transformer, or a Rogowski coil.

The control module 3 includes the current detector circuit 32 in each of the plurality of circuit blocks B1. That is to say, the control module 3 includes a plurality of current detector circuits 32. As can be seen, the control module 3 includes one or more current detector circuits 32, which are associated one to one with the one or more load circuits 8. Each of the one or more current detector circuits 32 detects a current supplied to its associated load circuit 8.

The voltage detector circuit 33 includes a voltmeter, for example. The voltage detector circuit 33 detects voltage output to one or more load circuits 8. In this embodiment, the voltage detector circuit 33 is electrically connected to the two electric wires between the input terminals 34 and the output terminals 35.

In FIG. 1, the electric wires PL5 between the output terminals 35 and the load circuit 8 are passed inside the cabinet 43 of the distribution board 4. However, this is only an example and the electric wires PL5 do not have to be passed inside the cabinet 43.

The control module 3 includes a computer system including one or more processors and a memory. At least some of the functions of the control module 3 are performed by making the processor of the computer system execute a program stored in the memory of the computer system. The program may be stored in the memory. The program may also be downloaded via a telecommunications line such as the Internet or distributed after having been stored in a non-transitory storage medium such as a memory card.

Figure 3:
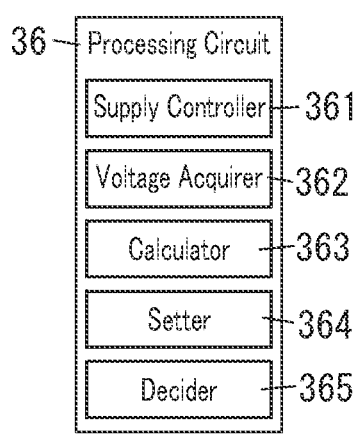
FIG. 3 is a block diagram of a processing circuit of the switching system.

The processing circuit 36 includes the one or more processors described above. As shown in FIG. 3, the processing circuit 36 includes the supply controller 361, a voltage acquirer 362, a calculator 363, a setter 364, and a decider 365. Note that these constituent elements just represent functions to be performed by the processing circuit 36 and do not necessarily have a substantive physical configuration.

The supply controller 361 opens and closes the supply transfer switch 31. For example, if the supply transfer switch 31 is a mechanical switch, then the supply controller 361 opens and closes the supply transfer switch 31 by controlling a motorized actuator provided in the vicinity of the supply transfer switch 31. On the other hand, if the supply transfer switch 31 includes a semiconductor switch (in particular, a MOSFET), then the supply controller 361 opens and closes the supply transfer switch 31 by changing the gate voltage of the MOSFET.

The voltage acquirer 362 acquires a voltage detection result from the voltage detector circuit 33 of each circuit block B1. The calculator 363 calculates, based on the voltage detected by the voltage detector circuit 33 and the current detected by the current detector circuit 32, the power to be delivered to the load circuit 8.

The supply controller 361 of the control module 3 opens and closes the supply transfer switch 31 based on the power calculated by the calculator 363. More specifically, the calculator 363 calculates the output power on a circuit block B1 basis, i.e., input power (output power) on a load circuit 8 basis. Thus, in the event of power outage, the supply controller 361 may disconnect, for example, a particular supply transfer switch 31 preferentially if the particular supply transfer switch 31 is included in a circuit blocks B1 that has greater input power (or output power) than any other circuit block B1. In other words, the supply controller 361 cuts off the delivery of power to a particular load circuit 8 preferentially if the particular load circuit 8 has greater input power (or output power) than any other load circuit 8. This enables cutting down the power consumption and thereby delivering power for a longer time to a load circuit 8 to which power has been delivered continuously.

Optionally, a degree of priority may be set for each circuit block B1. The supply controller 361 may make correction, according to the degree of priority, to the output power that has been calculated by the calculator 363 on a circuit block B1 basis. Specifically, the higher the degree of priority of a given circuit block B1 is, the smaller the value of the output power calculated by the calculator 363 and then corrected by the supply controller 361 may be. This may reduce the chances of the supply transfer switch 31 included in a circuit block B1 with a high degree of priority being disconnected.

Also, power outrage is not the only event that requires the supply controller 361 to disconnect at least some supply transfer switches 31. For example, even when power is delivered from the second power supply 62 (distributed power supply), the supply controller 361 may disconnect at least some supply transfer switches 31 according to the state of the second power supply 62. As used herein, the state of the second power supply 62 may be, for example, the state about its output power and output voltage. For example, if the output power or output voltage of the second power supply 62 has become less than its associated threshold value, then the supply controller 361 may disconnect at least some supply transfer switches 31. Also, if the second power supply 62 is a rechargeable battery system, an example of the state of the second power supply 62 is a state about the battery level (remaining capacity) of the rechargeable battery system. For example, if the battery level has become less than a predetermined threshold value, the supply controller 361 may disconnect at least some supply transfer switches 31.

The setter 364 will be described later for the second embodiment.

The decider 365 decides, based on the first voltage detected by the first supply voltage detector circuit 27 and the second voltage detected by the second supply voltage detector circuit 28, whether the state of power delivery to the main breaker 41 is the first state or the second state. That is to say, the decider 365 distinguishes the first state where power is delivered from the first power supply 61 and the second state where power is delivered from the second power supply 62 from each other.

More specifically, in the first state, the inverter 7 receives and delivers power via the grid-connected terminals 71 and stops delivering power via the autonomous terminals 72. As a result, the first voltage becomes greater than the threshold value and the second voltage becomes equal to or less than the threshold value. Thus, the decider 365 decides, by comparing the first voltage and the second voltage with the threshold value, that the power delivery state be the first state.

On the other hand, in the second state, the inverter 7 stops receiving and delivering power via the grid-connected terminals 71 and delivers power via the autonomous terminals 72. As a result, the first voltage becomes equal to or less than the threshold value and the second voltage becomes greater than the threshold value. Thus, the decider 365 decides, by comparing the first voltage and the second voltage with the threshold value, that the power delivery state be the second state.

The supply controller 361 of the control module 3 opens and closes the supply transfer switches 31 based on the decision made by the decider 365. For example, if the power delivery state is the second state, the supply controller 361 may open more supply transfer switches 31 than in a situation where the power delivery state is the first state. That is to say, in the second state, the number of the load circuits 8 to which power is delivered may be decreased compared to the first state.

As shown in FIG. 1, the control module 3 further includes a housing 38. The housing 38 is provided adjacent to the housing 29 of the power switching section 2. The housing 38 is housed in the casing C1 of the switching system 1. The housing 38 houses the other constituent elements of the control module 3. Specifically, the housing 38 houses the plurality of circuit blocks B1, the processing circuit 36, and the communications circuit 37.

The control module 3 further includes a plurality of display units 39. The plurality of display units 39 display the opened and closed states of the respective supply transfer switches 31 of the plurality of circuit blocks B1. Each display unit 39 may include a light source, for example, and display the opened and closed states of an associated supply transfer switch 31 by changing the lighting state of the light source.

As shown in FIG. 2, the communications circuit 37 of the control module 3 communicates with an external terminal E1. That is to say, the communications circuit 37 and the external terminal E1 transmit and receive signals to/from each other either directly or indirectly via a network or a relay, for example, in compliance with an appropriate wired or wireless communications protocol.

(5) External Terminal

Examples of the external terminal E1 include cellular phones such as smartphones, tablet computers, wearable terminals, and personal computers. The external terminal E1 includes an output interface such as a display and an input interface such as a touchscreen panel.

The communications circuit 37 of the control module 3 transmits, to the external terminal E1, information about at least one selected from the group consisting of the power calculated by the calculator 363, the opened or closed state of the power transfer switch 21, and the opened or closed state of the supply transfer switch 31. The external terminal E1 makes the output interface present the information thus received to the user.

In addition, the communications circuit 37 also receives, from the external terminal E1, setting information about the supply controller's 361 operation of opening and closing the supply transfer switch 31. The setting information may be specified by, for example, letting the user operate the input interface of the external terminal E1. The setting information may be, for example, information about the output power of the circuit block B1. The information about the output power includes, for example, information about the output voltage.

The supply controller 361 opens and closes the supply transfer switch 31 in accordance with the setting information. For example, if at least any circuit blocks B1 include no voltage detector circuit 33, then the calculator 363 calculates the output power of at least some circuit blocks B1 (i.e., the power delivered to the load circuit 8) based on information, included in the setting information, about the output voltage of at least some circuit blocks B1 instead of the voltage detected by the voltage detector circuit 33. The supply controller 361 opens and closes the supply transfer switch 31 based on the power thus calculated.

(6) Casing

As shown in FIG. 1, the casing C1 of the switching system 1 houses the power switching section 2 and the control module 3. The casing C1 includes a body C11 and a cover C12. The body C11 is formed in the shape of a box, of which the front surface has an opening C110. The cover C12 closes the opening C110 of the body C11.

In addition, the cover C12 also has a window C120 (opening). When the cover C12 closes the opening C110 of the body C11, the plurality of display units 39 of the control module 3 are exposed through the window C120.

Figure 4:
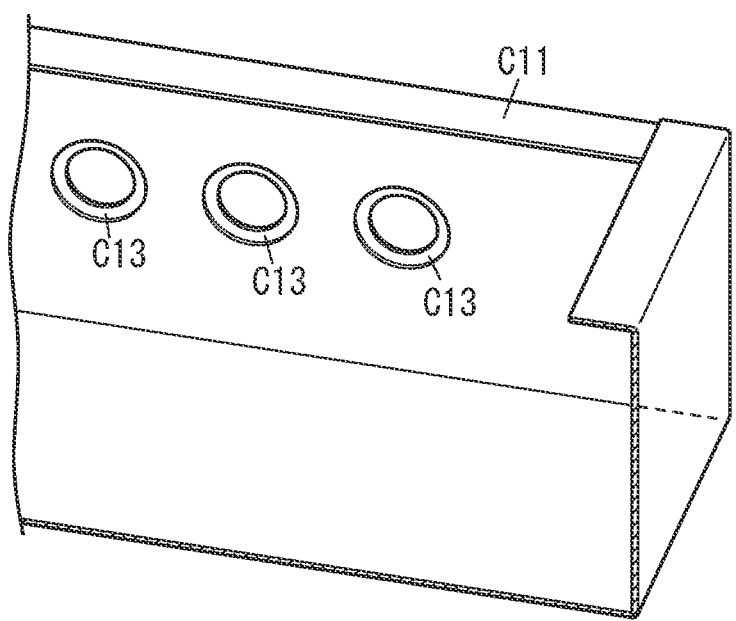
FIG. 4 is a partially cutaway perspective view illustrating a main part of a casing of the switching system.

As shown in FIG. 4, the casing C1 may have at least one (e.g., three in FIG. 4) knockout C13. In this embodiment, the knockouts C13 are provided for a side surface of the body C11. The knockout C13 is a portion, having lower mechanical strength than its surroundings, of the side surface of the body C11. More specifically, the knockout C13 may be formed, for example, to have a smaller thickness than its surroundings. Alternatively, the knockout C13 may also be provided with a cutout, for example. In this embodiment, the knockout C13 is provided to have an annular shape. A through hole is formed through the side surface of the body C11 by punching the knockout C13. The first power cable PL1 (refer to FIG. 2) and the second power cable PL2 (refer to FIG. 2) are passed through the through hole thus formed. The first power cable PL1 electrically connects the power transfer switch 21 and the main breaker 41 to each other. The second power cable PL2 electrically connects one of the branch breakers 42 and an associated one of the supply transfer switches 31 to each other.

In addition, a first end of a conduit duct D1 (refer to FIG. 1) is also passed through the through hole formed by punching the knockout C13. A second end of the conduit duct D1 is passed through a through hole provided through the cabinet 43 of the distribution board 4. The conduit duct D1 is a duct for protecting the electric wires (namely, the first power cable PL1 and the second power cable PL2). The first power cable PL1 and the second power cable PL2 are passed inside the conduit duct D1.

In FIG. 1, the electric wires that electrically connect the power switching section 2 to the first power supply 61 and the electric wires that electrically connect the power switching section 2 to the inverter 7 are also passed inside conduit ducts D2 and D3, respectively.

Note that even if the casing C1 is provided with no knockouts C13, the through holes may also be formed as appropriate by the worker.

(7) Connection Between Switching System and Control Module

The switching system 1 further includes electric wires PL3 (refer to FIG. 2) that electrically connect the power switching section 2 to the control module 3. One end of the electric wires PL3 is electrically connected, for example, between the output terminals 25 and the power transfer switch 21 of the power switching section 2. The electric wires PL3 supply power from the power switching section 2 to the control module 3.

(8) Advantages

As can be seen from the foregoing description, in the switching system 1 according to this embodiment, the power switching section 2 and the control module 3 are housed in the single casing C1, thus achieving the following advantages.

First of all, the power cable (electric wires PL3) for connecting the power switching section 2 and the control module 3 to each other, the signal lines, and other lines may be connected in advance before the switching system 1 is brought into the installation spot (e.g., before the switching system 1 is shipped). This enables reducing the man hours on the installation spot.

In addition, the power switching section 2 and the control module 3 may share the same constituent elements. For example, when the power switching section 2 needs to communicate with the external terminal E1 to notify the user of the opened or closed state of the power transfer switch 21, the power switching section 2 may establish communication using the communications circuit 37 of the control module 3.

In addition, the power cables may be bundled together for both the power switching section 2 and the control module 3, which also contributes to reducing not only the overall size of the switching system 1 but also the installation man hours required as well. For example, the first power cable PL1 and the second power cable PL2 may be both passed through a through hole formed by punching the knockout C13. Furthermore, this may also reduce the number of the through holes and conduit ducts D1 required.

Furthermore, mounting the power switching section 2 and the control module 3 may be finished by mounting the casing C1 onto a target of mounting such as a wall. This enables reducing the man hours required for mounting, compared to a situation where the power switching section 2 and the control module 3 are provided for two different casings.

Variations of First Embodiment

Next, variations of the first embodiment will be enumerated one after another. Note that the variations to be described below may be adopted in combination as appropriate.

In the first embodiment described above, the decider 365 determines, based on the first voltage detected by the first supply voltage detector circuit 27 and the second voltage detected by the second supply voltage detector circuit 28, whether the state of power delivery to the main breaker 41 is the first state or the second state. However, this is only an example and should not be construed as limiting. Alternatively, the decider 365 may also determine, in accordance with information acquired from the inverter 7, whether the state of power delivery to the main breaker 41 is the first state or the second state. That is to say, the inverter 7 may provide the decider 365 with information about whether the operation mode of the inverter 7 is the grid-connected operation mode or the autonomous operation mode. The grid-connected operation mode corresponds to the first state and the autonomous operation mode corresponds to the second state. Thus, the decider 365 may distinguish the first state and the second state from each other.

In the first embodiment described above, only one power transfer switch 21 is provided. However, this is only an example and should not be construed as limiting. Alternatively, the function of the power transfer switch 21 according to the first embodiment may also be performed by using a plurality of a-contact or b-contact power transfer switches, for example.

The number of the circuit blocks B1 provided is not limited to any particular value but has only to be at least one. In addition, the circuit block B1 does not have to include the current detector circuit 32 and the voltage detector circuit 33.

In the first embodiment described above, the supply transfer switch 31 is a double pole switch. However, this is only an example and should not be construed as limiting. Alternatively, the supply transfer switch 31 may also be a single pole switch.

In FIG. 2, some load circuit 8 is electrically connected to the secondary side terminals of one branch breaker 42 of the distribution board 4 not via the control module 3. The quantity of electricity (such as current, voltage, and power) about this load circuit 8 may also be measured using an instrument.

The supply controller 361 may open and close the supply transfer switch 31 in accordance with a signal supplied thereto in response to a predetermined operation performed by the user on the external terminal E1.

A power supply for powering the control module 3 may be built in the control module 3. The power supply may be, for example, a rechargeable battery or a capacitor with a large capacitance.

The casing C1 may have a through hole for passing the first power cable PL1 and the second power cable PL2 therethrough instead of the knockout C13. Alternatively, the casing C1 may have both the knockouts C13 and the through holes.

The switching system 1 according to the present disclosure includes a computer system. The computer system may include, as principal hardware components, a processor and a memory. At least some functions of the switching system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (VLSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Second Embodiment

Next, a switching system 1 according to a second embodiment will be described with reference to FIG. 5. In the following description, any constituent element of this second embodiment, having the same function as a counterpart of the first embodiment described above, will be designated by the same reference numeral as that counterpart's, and description thereof will be omitted herein. Note that the variations of the first embodiment are applicable as appropriate to the second embodiment as well.

In the switching system 1 according to the second embodiment, a plurality of (e.g., three in FIG. 5) voltage detector circuits 33 are arranged differently from the switching system 1 according to the first embodiment. Each of the three voltage detector circuits 33 is connected to its associated two terminals and detects the voltage between the two terminals. The three voltage detector circuits 33 detect the voltage output from the power switching section 2 to the main breaker 41. The voltage acquirer 362 (refer to FIG. 3) of the control module 3 acquires a voltage detection result from each of these three voltage detector circuits 33.

The voltage detector circuits 33 are housed in the casing C1 of the switching system 1. Although the three voltage detector circuits 33 are illustrated in FIG. 5 as being provided for the power switching section 2, the three voltage detector circuits 33 may actually be housed in the housing 38 (refer to FIG. 1) of the control module 3.

The three voltage detector circuits 33 detect respectively different voltages. More specifically, the three voltage detector circuits 33 detect the voltage between the L1 phase and the N phase, the voltage between the L2 phase and the N phase, and the voltage between the L1 phase and the L2 phase, respectively.

The setter 364 (refer to FIG. 3) of the control module 3 sets association between the three voltage detector circuits 33 and the one or more load circuits 81. That is to say, taking one load circuit 81, for example, the setter 364 associates the voltage detector circuit 33 for detecting the voltage between the two electric wires electrically connected to the load circuit 81 with the load circuit 81. For example, as for the load circuit 81 electrically connected to the L1-phase electric wire and the N-phase electric wire, the setter 364 associates the voltage detector circuit 33 for detecting the voltage between the same two phases, namely, the L1 phase and the N phase, with the load circuit 81.

The calculator 363 (refer to FIG. 3) calculates, based on the voltage detected by an associated voltage detector circuit 33 out of the three voltage detector circuits 33 and the current detected by the current detector circuit 32, the power to be delivered to the load circuit 81. This allows the calculator 363 to calculate the power to be delivered to the load circuit 81 as well as in the first embodiment. In addition, the number of the voltage detector circuits 33 provided may also be no greater than three, irrespective of the number of the circuit blocks B1 provided.

In addition, since the power switching section 2 and the control module 3 are housed in the single casing C1, the electric wires through which the respective voltage detector circuits 33 acquire the voltages may be connected in advance. That is to say, the voltage detector circuits 33 may be wired in advance to the electrical paths on which voltages are to be detected by the voltage detector circuits 33. This may reduce the man hours required and may also reduce the chances of wiring errors.

The setter 364 sets association between the three voltage detector circuits 33 and the one or more load circuits 81 in accordance with, for example, the information transmitted from the external terminal E1. That is to say, the user is allowed to specify, by operating the external terminal E1, which voltage detector circuit 33 each load circuit 81 is associated with. The association between the three voltage detector circuits 33 and the one or more load circuits 81 is stored in a memory of the control module 3.

Optionally, according to a first variation of this second embodiment, the voltage detector circuits 33 may be provided outside of the casing C1 of the switching system 1. For example, the voltage detector circuits 33 may be provided for the distribution board 4.

Also, according to a second variation of this second embodiment, the user may also specify, by operating an operating member (such as a DIP switch) provided for the switching system 1 instead of operating the external terminal E1, which voltage detector circuit 33 each load circuit 81 is associated with.

Furthermore, according to a third variation of this second embodiment, the voltage detector circuits 33 may be omitted. In that case, the setter 364 sets the voltage to be applied to each load circuit 81. The setter 364 sets, in accordance with, for example, information transmitted from the external terminal E1, the voltage to be applied to each load circuit 81. That is to say, the user is allowed to specify, on an individual basis, by operating the external terminal E1, how many volts the voltage to be applied to each load circuit 8 should be. For example, the user may choose the voltage to be applied to each load circuit 8 from 120 V and 240 V. Information about the voltage applied to each load circuit 81 is stored in the memory of the control module 3. The calculator 363 calculates, based on the voltage that has been set by the setter 364, the power to be delivered to the load circuit 81. In this third variation, the user may specify, on an individual basis, by operating the operating member (such as a DIP switch) provided for the switching system 1, how many volts the voltage to be applied to each load circuit 81 should be.

Furthermore, according to a fourth variation of this second embodiment, when the switching system 1 is introduced into a facility such as a single-phase two-wire system, the voltage is 120 V, for example, irrespective of the measuring point. Thus, there is no need to associate the voltage detector circuits 33 with the load circuit(s) 81 or set the voltage to be applied, for example.

Third Embodiment

Figure 6:
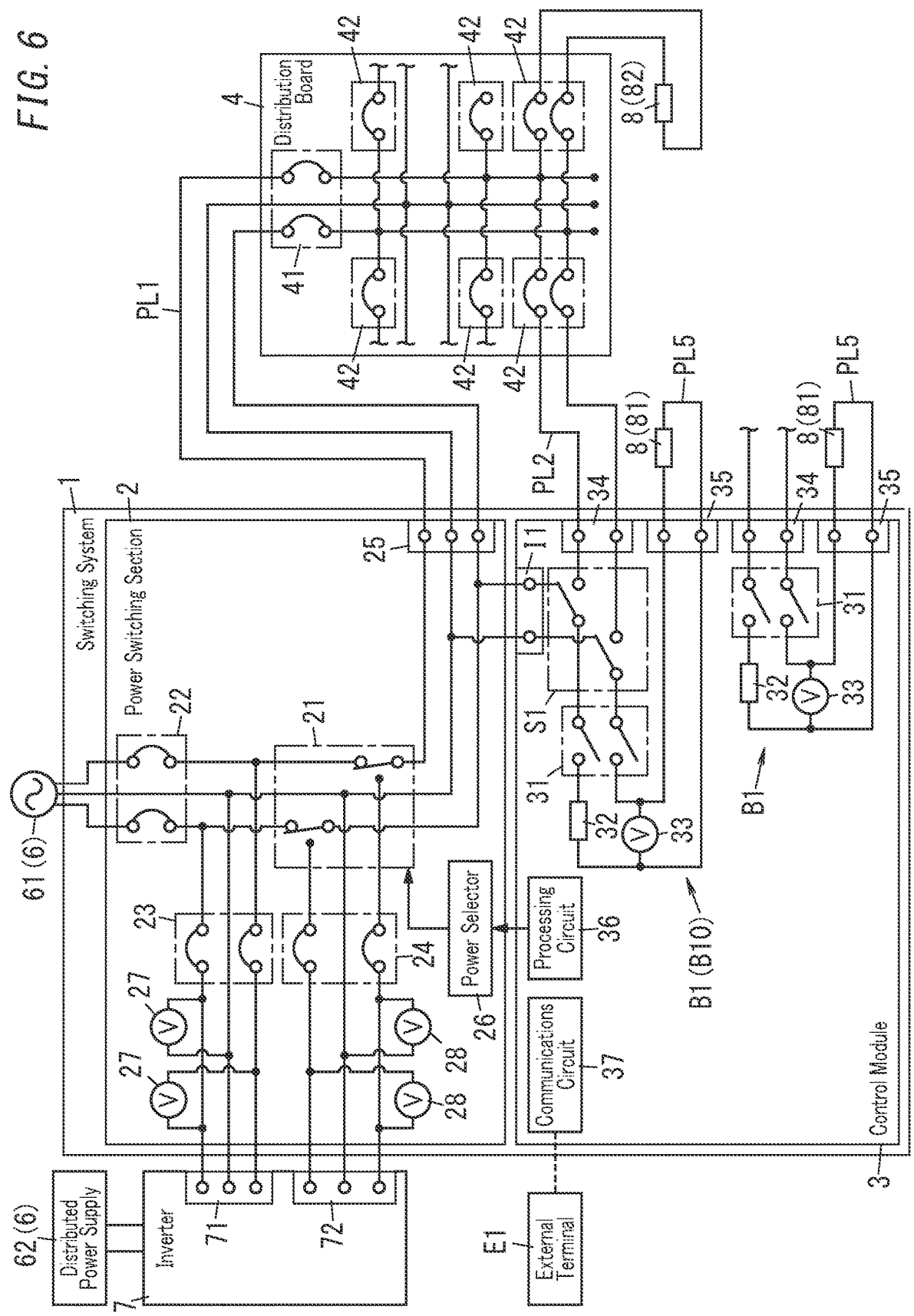
FIG. 6 is a circuit diagram illustrating a configuration for a switching system according to a third embodiment.

Next, a switching system 1 according to a third embodiment will be described with reference to FIG. 6. In the following description, any constituent element of this third embodiment, having the same function as a counterpart of the first embodiment described above, will be designated by the same reference numeral as that counterpart's, and description thereof will be omitted herein. Note that the variations of the first embodiment and the second embodiment (including variations thereof) are applicable as appropriate to the third embodiment as well.

The control module 3 further includes a selector circuit S1. More specifically, at least one circuit block B10 out of the plurality of circuit blocks B1 of the control module 3 further includes the selector circuit S1 and input terminals I1. The selector circuit S1 includes two c-contact switches provided for two electric wires that electrically connect the input terminals 34 and the output terminals 35 to each other. The selector circuit S1 changes a state where the supply transfer switch 31 and the input terminals I1 are electrically connected to each other into a state where the supply transfer switch 31 and the input terminals 34 are electrically connected to each other, or vice versa. The input terminals I1 are electrically connected to the output terminals 25 of the power switching section 2.

The selector circuit S1 switches the power supply routes, along each of which power is supplied from the power switching section 2 to the supply transfer switch 31, from a first route to a second route, or vice versa. The first route is a route along which power is directly supplied from the power switching section 2 to the supply transfer switch 31. That is to say, the first route is a route along which power is supplied from the power switching section 2 to the supply transfer switch 31 via the input terminals I1. The second route is a route along which power is supplied from the power switching section 2 to the supply transfer switch 31 via the distribution board 4. That is to say, the second route is a route along which power is supplied from the distribution board 4 to the supply transfer switch 31 via the input terminals 34.

The supply controller 361 opens and closes the two c-contact switches of the selector circuit S1. The supply controller 361 switches, when the power selector 26 has changed the state of power delivery to the main breaker 41 into the second state, for example, the power supply routes, along each of which power is supplied from the power switching section 2 to the supply transfer switch 31, to the first route.

This embodiment enables, when the first power supply 61 (commercial power supply) is not available due to power outage, delivering, along the first route not via the distribution board 4, power to the load circuit 8 connected to the control module 3.

Furthermore, if a plurality of supply transfer switches 31 are provided, the first route does not have to be provided for all of the supply transfer switches 31. Alternatively, the first route may be provided for only some supply transfer switch 31 as shown in FIG. 6. That is to say, only some circuit block B10 may include the selector circuit S1.

Note that the switches included in the selector circuit S1 do not have to be c-contact switches but may be a-contact switches or b-contact switches as well.

Optionally, the first route and the second route may be switched depending on an appropriate condition. Alternatively, the first route and the second route may also be switched in accordance with the user's operating command entered through the external terminal E1.

Fourth Embodiment

Next, a switching system 1 according to a fourth embodiment will be described with reference to FIG. 2. In the following description, any constituent element of this fourth embodiment, having the same function as a counterpart of the first embodiment described above, will be designated by the same reference numeral as that counterpart's, and description thereof will be omitted herein. Note that the variations of the first embodiment and the second and third embodiments (including variations thereof) are applicable as appropriate to the fourth embodiment as well.

In this embodiment, the supply controller 361 of the control module 3 opens (disconnects), when the state of power delivery to the main breaker 41 changes from the first state into the second state, preselected supply transfer switch(es) 31 out of the plurality of supply transfer switches 31. That is to say, the supply controller 361 opens, when the operation mode of the inverter 7 changes from the grid connected operation mode into the autonomous operation mode, the preselected supply transfer switch(es) 31 out of the plurality of supply transfer switches 31. In this case, the supply controller 361 may open some or all of the plurality of supply transfer switches 31, whichever is appropriate.

According to this embodiment, at the beginning of the autonomous operation mode, the supply controller 361 interrupts some load circuit 8 by opening at least one supply transfer switch 31, thus reducing the chances of the output of the inverter 7 reaching an upper limit. Optionally, after having opened at least one supply transfer switches 31, the supply controller 361 may close that supply transfer switch 31 depending on a condition.

Fifth Embodiment

Next, a switching system 1 according to a fifth embodiment will be described with reference to FIG. 2. In the following description, any constituent element of this fifth embodiment, having the same function as a counterpart of the first embodiment described above, will be designated by the same reference numeral as that counterpart's, and description thereof will be omitted herein. Note that the variations of the first embodiment and the second, third, and fourth embodiments (including variations thereof) are applicable as appropriate to the fifth embodiment as well.

In this embodiment, the supply controller 361 of the control module 3 opens (disconnects), when the state of power delivery to the main breaker 41 is the second state and the delivery of power from the second power supply 62 to the main breaker 41 has been cut off, preselected supply transfer switch(es) 31 out of the plurality of supply transfer switches 31. That is to say, the supply controller 361 opens, if the output of the second power supply 62 (distributed power supply) has stopped, the preselected supply transfer switch(es) 31 out of the plurality of supply transfer switches 31. In this case, the supply controller 361 may open some or all of the plurality of supply transfer switches 31, whichever is appropriate.

This embodiment enables interrupting at least some load circuit 8 as soon as the distributed power supply stops outputting power.

Sixth Embodiment

Figure 7:
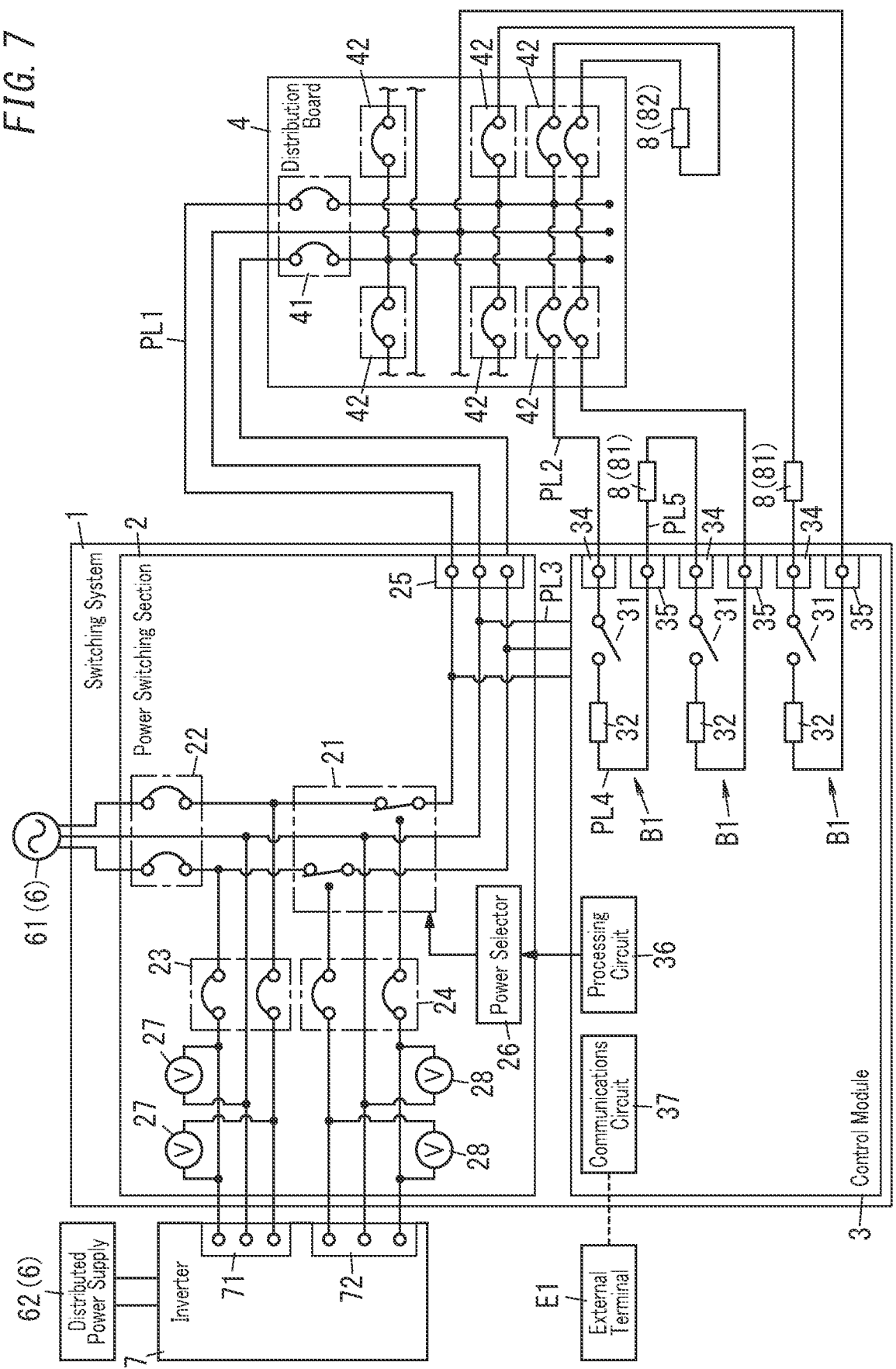
FIG. 7 is a circuit diagram illustrating a configuration for a switching system according to a sixth embodiment.

Next, a switching system 1 according to a sixth embodiment will be described with reference to FIG. 7. In the following description, any constituent element of this sixth embodiment, having the same function as a counterpart of the first embodiment described above, will be designated by the same reference numeral as that counterpart's, and description thereof will be omitted herein. Note that the variations of the first embodiment and the second, third, fourth, and fifth embodiments (including variations thereof) are applicable as appropriate to the sixth embodiment as well.

In this embodiment, in at least one circuit block B1 out of the plurality of circuit blocks B1, the input terminal 34 and the output terminal 35 are electrically connected to each other via a single electric wire PL4. The electric wire PL4 is provided with the supply transfer switch 31 and the current detector circuit 32.

A load circuit 8 which receives the voltage between two voltage lines (corresponding to the L1 phase and the L2 phase) is electrically connected, for example, between the output terminal 35 of a first circuit block out of the plurality of circuit blocks B1 and the input terminal 34 of a second circuit block out of the plurality of circuit blocks B1. The input terminal 34 of the first circuit block and the output terminal 35 of the second circuit block are respectively electrically connected to the secondary side terminals of a branch breaker 42.

Another load circuit 8 which receives the voltage between one voltage line and the neutral line is electrically connected, for example, between the secondary side terminal of another branch breaker 42 and the input terminal 34 of a third circuit block out of the plurality of circuit blocks B1. The output terminal 35 of the third circuit block is electrically connected to a neutral line extended from the distribution board 4.

Optionally, in this embodiment, the input terminal 34 and the output terminal 35 may be interchanged with each other in each circuit block B1.

Figure 5:
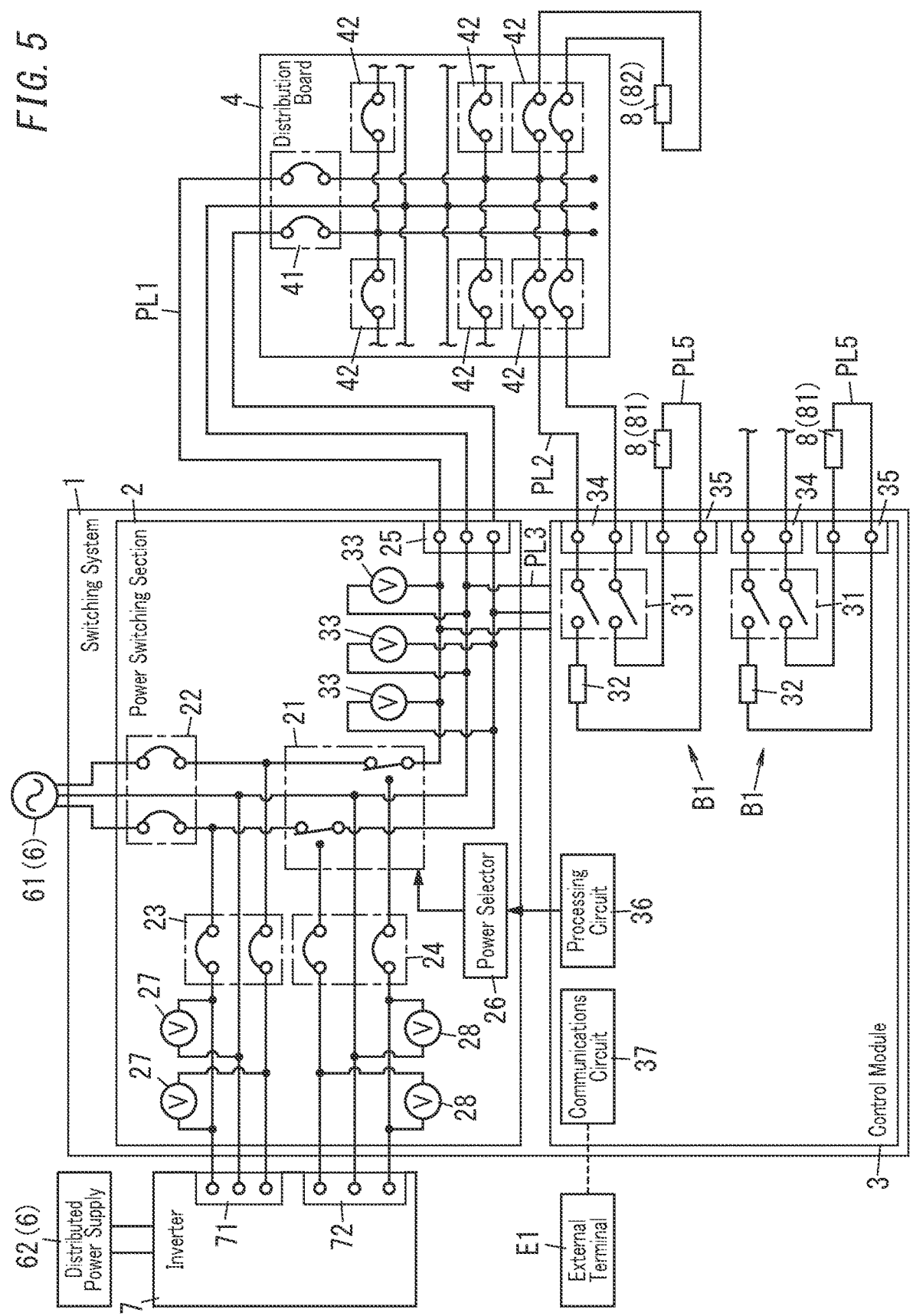
FIG. 5 is a circuit diagram illustrating a configuration for a switching system according to a second embodiment.

Also, if the voltage output to a load circuit 8 needs to be detected, then either the voltage applied to an electric wire of the power switching section 2 or the voltage applied to an electric wire of the distribution board 4 may be detected as already described for the second embodiment (refer to FIG. 5).

This embodiment enables reducing the number of electric wires of the control module 3.

Note that if the control module 3 includes a plurality of circuit blocks B1, the configuration in which the input terminal 34 and the output terminal 35 are electrically connected to each other via a single electric wire PL4 does not have to be applied to all circuit blocks B1 but may be applied to only some circuit blocks B1.

Seventh Embodiment

Figure 8:
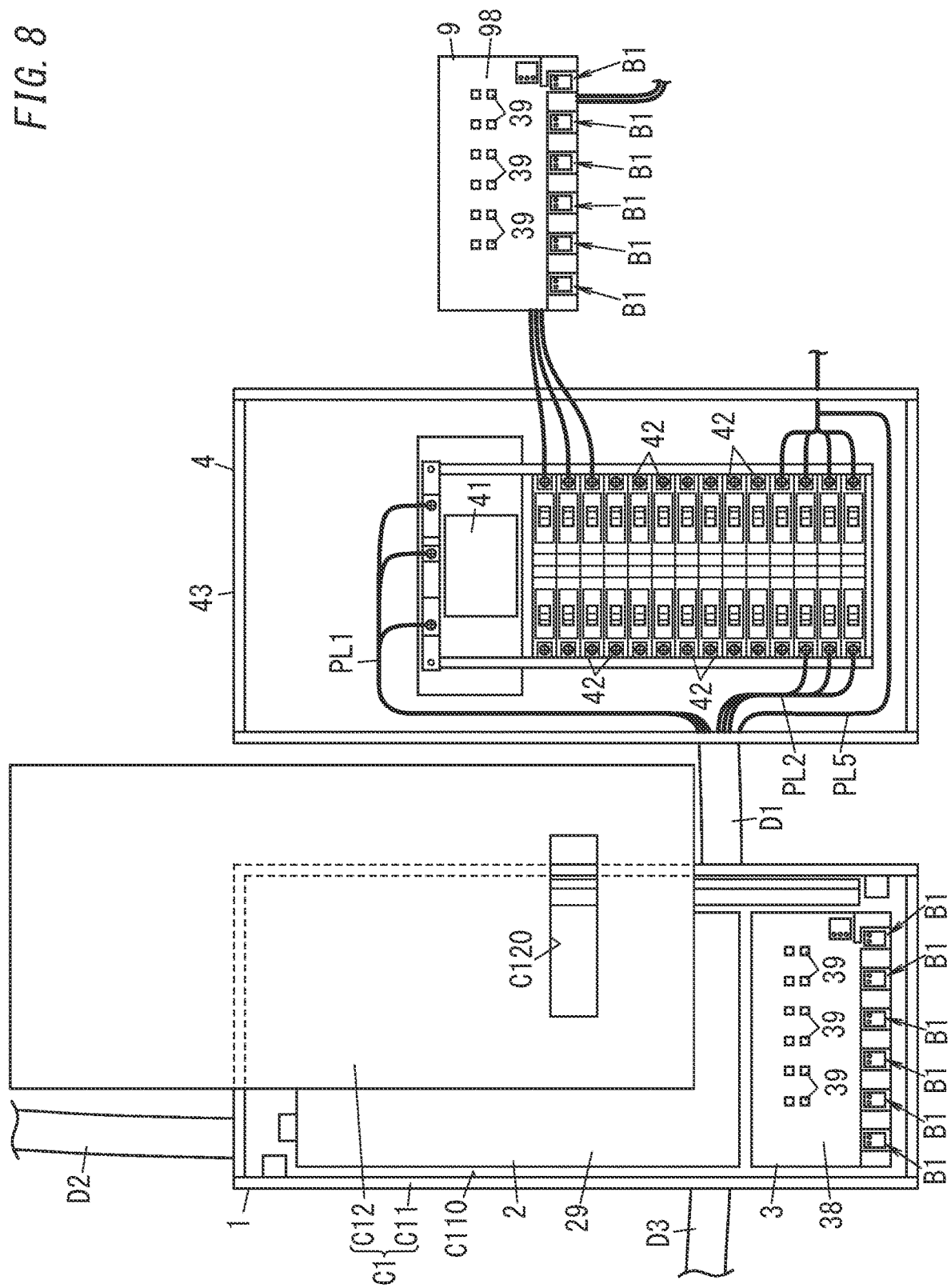
FIG. 8 is a front view illustrating an installation state of a switching system according to a seventh embodiment.

Next, a switching system 1 according to a seventh embodiment will be described with reference to FIG. 8. In the following description, any constituent element of this seventh embodiment, having the same function as a counterpart of the first embodiment described above, will be designated by the same reference numeral as that counterpart's, and description thereof will be omitted herein. Note that the variations of the first embodiment and the second, third, fourth, fifth, and sixth embodiments (including variations thereof) are applicable as appropriate to the seventh embodiment as well.

The switching system 1 according to this embodiment is used along with an expanded module 9. The expanded module 9 includes a housing 98. The expanded module 9 is provided outside of the casing C1. That is to say, the housing 98 of the expanded module 9 is provided outside of the casing C1. The expanded module 9 has the same configuration as the control module 3, and therefore, a detailed description thereof will be omitted herein.

The expanded module 9, as well as the control module 3, includes at least one circuit block B1. The circuit block B1 of the expanded module 9 is electrically connected between a branch breaker 42 and a load circuit 8.

The circuit block B1 of the expanded module 9 includes a supply transfer switch 31 and cuts off the power supplied from the branch breaker 42 by opening the supply transfer switch 31. The supply transfer switch 31 of the expanded module 9 may be controlled in the same way as the supply transfer switch 31 of the control module 3.

In addition, the circuit block B1 of the expanded module 9 preferably includes a current detector circuit 32 and detects a current to be supplied to the load circuit 8.

Furthermore, the circuit block B1 of the expanded module 9 preferably includes a voltage detector circuit 33 and detects a voltage to be applied to the load circuit 8.

The expanded module 9 communicates with the power switching section 2. That is to say, the expanded module 9 and the power switching section 2 transmit and receive signals to/from each other either directly or indirectly via a network or a relay, for example, in compliance with an appropriate wired or wireless communications protocol.

In addition, the expanded module 9 also communicates with the external terminal E1. Thus, the expanded module 9 receives setting information about the operation of opening and closing the supply transfer switch 31 from the external terminal E1. The expanded module 9 transmits, to the external terminal E1, information about at least one of the power to be delivered to the load circuit 8 or the opened or closed state of the supply transfer switch 31.

This embodiment enables controlling the delivery of power to a larger number of load circuits 8 by using the expanded module 9.

Eighth Embodiment

Next, a switching system 1 according to an eighth embodiment will be described with reference to FIG. 9. In the following description, any constituent element of this eighth embodiment, having the same function as a counterpart of the first embodiment described above, will be designated by the same reference numeral as that counterpart's, and description thereof will be omitted herein. Note that the variations of the first embodiment and the second, third, fourth, fifth, sixth, and seventh embodiments (including variations thereof) are applicable as appropriate to the eighth embodiment as well.

This embodiment is different from the first embodiment in the configuration of the power switching section 2. In the other respects, the eighth embodiment is the same as the first embodiment.

Figure 9:
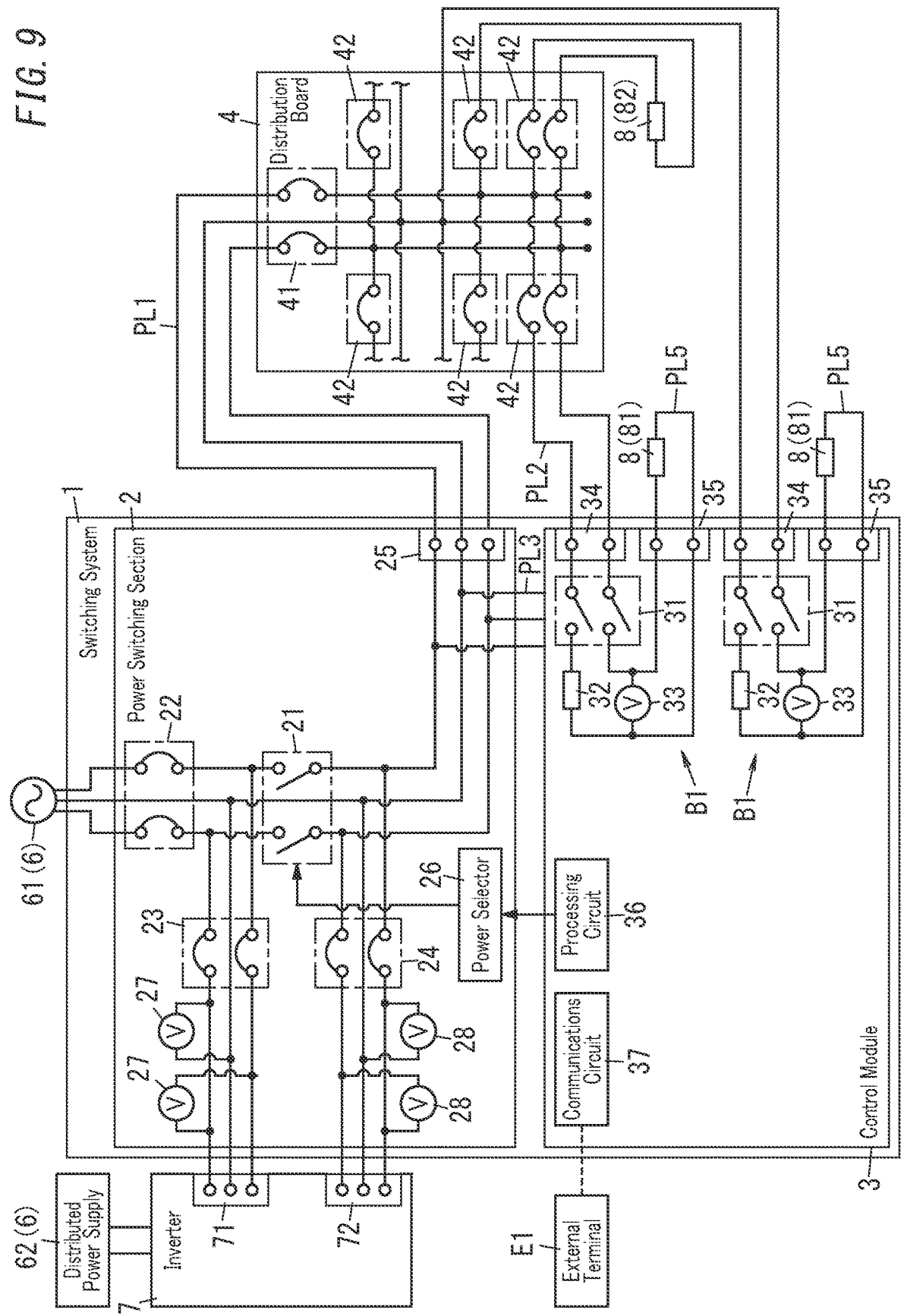
FIG. 9 is a circuit diagram illustrating a configuration for a switching system according to an eighth embodiment.

As shown in FIG. 9, the power transfer switch 21 is either an a-contact switch or a b-contact switch. The autonomous terminals 72 of the inverter 7 are electrically connected to an electrical path between the power transfer switch 21 and the output terminals 25.

While the inverter 7 is operating in the grid-connected operation mode, the power selector 26 closes the power transfer switch 21, thus switching the power switching section 2 to the first state where power is delivered from the first power supply 61. In the first state, the grid-connected terminals 71 of the inverter 7 are electrically connected to the first power supply 61.

On the other hand, while the inverter 7 is operating in the autonomous operation mode, the power selector 26 opens the power transfer switch 21, thus switching the power switching section 2 to the second state where power is delivered from the second power supply 62. In the second state, the inverter 7 supplies the AC power to the output terminals 25 of the power switching section 2 via the autonomous terminals 72.

Variation of Eighth Embodiment

Next, a switching system 1 according to a variation of the eighth embodiment will be described. In the following description, any constituent element of this variation, having the same function as a counterpart of the eighth embodiment described above, will be designated by the same reference numeral as that counterpart's, and description thereof will be omitted herein.

In the eighth embodiment, the autonomous terminals 72 of the inverter 7 may also be used as terminals serving as both the grid-connected terminals 71 and the autonomous terminals 72. In that case, the inverter 7 does not have to include the grid-connected terminals 71.

To connect the inverter 7 to the power grid, the power selector 26 closes the power transfer switch 21, thus switching the power switching section 2 to the first state where power is delivered from the first power supply 61. In the first state, the autonomous terminals 72 of the inverter 7 are electrically connected to the first power supply 61.

To allow the inverter 7 to operate autonomously, the power selector 26 opens the power transfer switch 21, thus switching the power switching section 2 to the second state where power is delivered from the second power supply 62. In the second state, the inverter 7 supplies AC power to the output terminals 25 of the power switching section 2 via the autonomous terminals 72.

(Recapitulation)

The exemplary embodiments and their variations described above are specific implementations of the following aspects of the present disclosure.

A switching system (1) according to a first aspect includes a power switching section (2), a control module (3), and a casing (C1). The power switching section (2) includes at least one power transfer switch (21) and a power selector (26). The at least one power transfer switch (21) is electrically connected between a plurality of power supplies (6) and a main breaker (41) of a distribution board (4). The plurality of power supplies (6) includes a first power supply (61) and a second power supply (62). The power selector (26) changes a first state where power is delivered from the first power supply (61) to the main breaker (41) into a second state where power is delivered from the second power supply (62) to the main breaker (41), or vice versa, by opening and closing the at least one power transfer switch (21). The control module (3) includes one or more supply transfer switches (31) and a supply controller (361). The one or more supply transfer switches (31) are electrically connected between one or more branch breakers (42) out of a plurality of branch breakers (42) of the distribution board (4) and one or more load circuits (8) associated one to one with the one or more branch breakers (42). The supply controller (361) opens and closes the one or more supply transfer switches (31). The casing (C1) houses the power switching section (2) and the control module (3).

This configuration enables reducing the man hours required to install the power switching section (2) and the control module (3) compared to a situation where the power switching section (2) and the control module (3) are housed in two different casings.

In a switching system (1) according to a second aspect, which may be implemented in conjunction with the first aspect, the control module (3) further includes a voltage acquirer (362), one or more current detector circuits (32), and a calculator (363). The voltage acquirer (362) acquires a voltage detection result from a voltage detector circuit (33). The voltage detector circuit (33) detects either voltage output from the power switching section (2) to the main breaker (41) or voltage output from the control module (3) to the one or more load circuits (8). The one or more current detector circuits (32) are associated one to one with the one or more load circuits (8). Each of the one or more current detector circuits (32) detects a current supplied to an associated one of the one or more load circuits (8). The calculator (363) calculates, based on the voltage detected by the voltage detector circuit (33) and the current detected by the one or more current detector circuits (32), power to be delivered to the one or more load circuits (8). The supply controller (361) of the control module (3) opens and closes the one or more supply transfer switches (31) based on the power calculated by the calculator (363).

This configuration allows a current to be detected by one or more current detector circuits (32) of the control module (3), thus saving the trouble of installing one or more current detector circuits (32) in the distribution board (4), for example.

In a switching system (1) according to a third aspect, which may be implemented in conjunction with the second aspect, the voltage detector circuit (33) includes a plurality of voltage detector circuits (33). The plurality of voltage detector circuits (33) detect mutually different voltages. The control module (3) further includes a setter (364). The setter (364) sets association between the plurality of voltage detector circuits (33) and the one or more load circuits (8). The calculator (363) calculates, based on the voltage detected by an associated one of the plurality of voltage detector circuits (33) and the current detected by the one or more current detector circuits (32), the power to be delivered to the one or more load circuits (8).

This configuration enables calculating power according to the voltage applied to the load circuit(s) (8).

In a switching system (1) according to a fourth aspect, which may be implemented in conjunction with the second or third aspect, the control module (3) further includes a communications circuit (37) that communicates with an external terminal (E1).

This configuration allows the control module (3) to transmit and receive information to/from the external terminal (E1).

In a switching system (1) according to a fifth aspect, which may be implemented in conjunction with the fourth aspect, the communications circuit (37) transmits, to the external terminal (E1), information about at least one selected from the group consisting of: the power calculated by the calculator (363); an opened or closed state of the at least one power transfer switch (21); and an opened or closed state of the one or more supply transfer switches (31).

This configuration enables providing information acquired by the switching system (1) for the external terminal (E1).

In a switching system (1) according to a sixth aspect, which may be implemented in conjunction with the fourth or fifth aspect, the communications circuit (37) receives, from the external terminal (E1), setting information about an operation to be performed by the supply controller (361) to open and close the one or more supply transfer switches (31).

This configuration enables setting the switching system (1) using the external terminal (E1).

In a switching system (1) according to a seventh aspect, which may be implemented in conjunction with any one of the first to sixth aspects, the control module (3) further includes a selector circuit (S1). The selector circuit (S1) switches power supply routes from a first route to a second route, or vice versa. Each of the power supply routes allows power to be supplied from the power switching section (2) to the one or more supply transfer switches (31). The first route allows the power to be supplied directly from the power switching section (2) to the one or more supply transfer switches (31). The second route allows the power to be supplied indirectly from the power switching section (2) to the one or more supply transfer switches (31) via the distribution board (4). The first power supply (61) is a commercial power supply. The second power supply (62) is a distributed power supply. The supply controller (361) switches, when the power selector (26) has changed a state of power delivery to the main breaker (41) into the second state, the power supply routes, along each of which the power is supplied from the power switching section (2) to the one or more supply transfer switches (31), to the first route.

This configuration enables, when the commercial power supply is not available due to power outage, delivering power to the load circuit(s) (8) through the first route not via the distribution board (4).

A switching system (1) according to an eighth aspect, which may be implemented in conjunction with any one of the first to seventh aspects, further includes a first supply voltage detector circuit (27) and a second supply voltage detector circuit (28). The first supply voltage detector circuit (27) detects a first voltage supplied from the first power supply (61) to the at least one power transfer switch (21). The second supply voltage detector circuit (28) detects a second voltage supplied from the second power supply (62) to the at least one power transfer switch (21). The control module (3) further includes a decider (365). The decider (365) determines, based on the first voltage detected by the first supply voltage detector circuit (27) and the second voltage detected by the second supply voltage detector circuit (28), whether a state of power delivery to the main breaker (41) is the first state or the second state. The supply controller (361) of the control module (3) opens or closes the one or more supply transfer switches (31) in accordance with a decision made by the decider (365).

This configuration allows the decider (365) to determine the state of power delivery to the main breaker (41). In particular, in a situation where an inverter (7) is provided as in the exemplary embodiment described above, the decider (365) may determine, based on the first voltage and the second voltage, the state of power delivery to the main breaker (41) even without acquiring a signal indicating whether the inverter (7) is operating in the grid-connected operation mode or the autonomous operation mode. As can be seen, the control module (3) does not have to communicate with the inverter (7), thus saving the trouble of performing the installation work that would otherwise be involved to allow the control module (3) to communicate with the inverter (7). In addition, this also allows the decider (365) to determine the state of power delivery to the main breaker (41) even without adapting the processing by the control module (3) to the specification of the inverter (7).

In a switching system (1) according to a ninth aspect, which may be implemented in conjunction with any one of the first to eighth aspects, the first power supply (61) is a commercial power supply. The second power supply (62) is a distributed power supply. The supply controller (361) of the control module (3) opens at least one preselected supply transfer switch (31) out of the one or more supply transfer switches (31) when a state of power delivery to the main breaker (41) changes from the first state into the second state.

This configuration enables interrupting at least some load circuits (8) in the event of power outage.

In a switching system (1) according to a tenth aspect, which may be implemented in conjunction with any one of the first to ninth aspects, the first power supply (61) is a commercial power supply. The second power supply (62) is a distributed power supply. The supply controller (361) of the control module (3) opens at least one preselected supply transfer switch (31) out of the one or more supply transfer switches (31) when a state of power delivery to the main breaker (41) is the second state and delivery of the power from the second power supply (62) to the main breaker (41) is cut off.

This configuration enables interrupting at least some load circuit (8) when the output of the distributed power supply has stopped.

A switching system (1) according to an eleventh aspect, which may be implemented in conjunction with any one of the first to tenth aspects, further includes electric wires (PL3) that electrically connect the power switching section (2) to the control module (3). The electric wires (PL3) supply power from the power switching section (2) to the control module (3).

This configuration eliminates the need for connecting an external power supply to the control module (3), thus enabling reducing the installation man hours required.

In a switching system (1) according to a twelfth aspect, which may be implemented in conjunction with any one of the first to eleventh aspects, the casing (C1) has at least one of a through hole or a knockout (C13). A first power cable (PL1) and a second power cable (PL2) are passed through the through hole. The first power cable (PL1) electrically connects the at least one power transfer switch (21) and the main breaker (41) to each other. The second power cable (PL2) electrically connects the one or more branch breakers (42) and the one or more supply transfer switches (31) to each other. The knockout (C13) is formed to have lower strength than its surroundings and forms the through hole when punched.

According to this configuration, the first power cable (PL1) and the second power cable (PL2) are passed through a single through hole, thus reducing the space occupied by the first power cable (PL1) and the second power cable (PL2) compared to a situation where the first power cable (PL1) and the second power cable (PL2) are passed through two different through holes. In addition, when the casing (C1) of the switching system (1) and the distribution board (4) are connected together via a conduit duct (D1) for protecting the electric wires and the first power cable (PL1) and the second power cable (PL2) are passed through the conduit duct (D1), only one conduit duct (D1) is needed, thus enabling reducing the installation man hours required.

Note that the constituent elements according to the second to twelfth aspects are not essential constituent elements for the switching system (1) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A switching system comprising:
a power switching section including at least one power transfer switch and a power selector, the at least one power transfer switch being electrically connected between a plurality of power supplies and a main breaker of a distribution board, the plurality of power supplies including a first power supply and a second power supply, the power selector being configured to change a first state where power is delivered from the first power supply to the main breaker into a second state where power is delivered from the second power supply to the main breaker, or vice versa, by opening and closing the at least one power transfer switch;
a control module including
one or more input terminals electrically connected to one or more secondary side terminals of one or more branch breakers out of a plurality of branch breakers of the distribution board,
one or more output terminals electrically connected to one or more load circuits associated one to one with the one or more branch breakers,
one or more supply transfer switches, and
a supply controller, the one or more supply transfer switches being electrically connected between the one or more input terminals and the one or more output terminals the supply controller being configured to open and close the one or more supply transfer switches; and
a casing housing the power switching section and the control module.

2. The switching system of claim 1, wherein
the control module further includes:
a voltage acquirer configured to acquire a voltage detection result from a voltage detector circuit, the voltage detector circuit being configured to detect either voltage output from the power switching section to the main breaker or voltage output from the control module to the one or more load circuits;
one or more current detector circuits associated one to one with the one or more load circuits, each of the one or more current detector circuits being configured to detect a current supplied to an associated one of the one or more load circuits; and
a calculator configured to calculate, based on the voltage detected by the voltage detector circuit and the current detected by the one or more current detector circuits, power to be delivered to the one or more load circuits, and
the supply controller of the control module is configured to open and close the one or more supply transfer switches based on the power calculated by the calculator.

3. The switching system of claim 2, wherein
the voltage detector circuit includes a plurality of voltage detector circuits,
the plurality of voltage detector circuits are configured to detect mutually different voltages,
the control module further includes a setter configured to set association between the plurality of voltage detector circuits and the one or more load circuits, and
the calculator is configured to calculate, based on the voltage detected by an associated one of the plurality of voltage detector circuits and the current detected by the one or more current detector circuits, the power to be delivered to the one or more load circuits.

4. The switching system of claim 2, wherein
the control module further includes a communications circuit configured to communicate with an external terminal.

5. The switching system of claim 4, wherein
the communications circuit is configured to transmit, to the external terminal, information about at least one selected from the group consisting of: the power calculated by the calculator; an opened or closed state of the at least one power transfer switch; and an opened or closed state of the one or more supply transfer switches.

6. The switching system of claim 4, wherein
the communications circuit is configured to receive, from the external terminal, setting information about an operation to be performed by the supply controller to open and close the one or more supply transfer switches.

7. The switching system of claim 1, wherein
the control module further includes a selector circuit, the selector circuit being configured to switch power supply routes from a first route to a second route or vice versa, each of the power supply routes allowing power to be supplied from the power switching section to the one or more supply transfer switches, the first route allowing the power to be supplied directly from the power switching section to the one or more supply transfer switches, the second route allowing the power to be supplied indirectly from the power switching section to the one or more supply transfer switches via the distribution board,
the first power supply is a commercial power supply,
the second power supply is a distributed power supply, and
the supply controller is configured to, when the power selector has changed a state of power delivery to the main breaker into the second state, switch the power supply routes, along each of which the power is supplied from the power switching section to the one or more supply transfer switches, to the first route.

8. The switching system of claim 1, further comprising:
a first supply voltage detector circuit configured to detect a first voltage supplied from the first power supply to the at least one power transfer switch; and
a second supply voltage detector circuit configured to detect a second voltage supplied from the second power supply to the at least one power transfer switch, wherein
the control module further includes a decider configured to determine, based on the first voltage detected by the first supply voltage detector circuit and the second voltage detected by the second supply voltage detector circuit, whether a state of power delivery to the main breaker is the first state or the second state, and
the supply controller of the control module is configured to open or close the one or more supply transfer switches in accordance with a decision made by the decider.

9. The switching system of claim 1, wherein
the first power supply is a commercial power supply,
the second power supply is a distributed power supply, and
the supply controller of the control module is configured to open at least preselected one of the one or more supply transfer switches when a state of power delivery to the main breaker changes from the first state into the second state.

10. The switching system of claim 1, wherein the first power supply is a commercial power supply, the second power supply is a distributed power supply, and the supply controller of the control module is configured to open at least preselected one of the one or more supply transfer switches when a state of power delivery to the main breaker is the second state and delivery of the power from the second power supply to the main breaker is cut off.

11. The switching system of claim 1, further comprising electric wires that electrically connect the power switching section to the control module and supply power from the power switching section to the control module.

12. The switching system of claim 1, wherein the casing has at least one of:

a through hole through which a first power cable and a second power cable are passed, the first power cable electrically connecting the at least one power transfer switch and the main breaker to each other, the second power cable electrically connecting the one or more branch breakers and the one or more supply transfer switches to each other; or a knockout formed to have lower strength than surroundings and configured to form the through hole when punched.

13. The switching system of claim 1, wherein the power switching section further includes an output terminal electrically connected to a primary side terminal of the main breaker of the distribution board, in the first state, power is delivered from the first power supply to the main breaker via the output terminal of the power switching section, and in the second state, power is delivered from the second power supply to the main breaker via the output terminal of the power switching section.

\* \* \* \* \*